United States Patent
Zhang et al.

(10) Patent No.: US 12,161,995 B1
(45) Date of Patent: Dec. 10, 2024

(54) PREPARATION METHOD FOR NANOCOMPOSITE FIBER MEMBRANE MATERIAL BASED ON BIO-BASED LIQUEFIED FORMALDEHYDE RESIN

(71) Applicants: Nanjing Forestry University, Nanjing (CN); Aica Nanjing Co., Ltd, Nanjing (CN)

(72) Inventors: Qian Zhang, Nanjing (CN); Fengwen Sun, Nanjing (CN); Zhang Zhang, Nanjing (CN); Yangyan Qi, Nanjing (CN); Yundan Dong, Nanjing (CN)

(73) Assignees: Nanjing Forestry University, Nanjing (CN); Aica Nanjing Co., Ltd, Nanjing (CN)

( * ) Notice: Subject to any disclaimer, the term of this patent is extended or adjusted under 35 U.S.C. 154(b) by 0 days.

(21) Appl. No.: 18/676,521

(22) Filed: May 29, 2024

(30) Foreign Application Priority Data

Jul. 5, 2023 (CN) .......................... 202310816848.0

(51) Int. Cl.
*B01J 20/28* (2006.01)
*B01J 20/30* (2006.01)
*D01D 1/02* (2006.01)
*D01D 5/00* (2006.01)

(52) U.S. Cl.
CPC ...... *B01J 20/28038* (2013.01); *B01J 20/3078* (2013.01); *B01J 20/3085* (2013.01); *D01D 1/02* (2013.01); *D01D 5/003* (2013.01); *B01J 2220/44* (2013.01); *B01J 2220/4825* (2013.01)

(58) Field of Classification Search
CPC ............. B01J 20/28038; B01J 20/3078; B01J 20/3085; D01D 1/02; D01D 5/003
See application file for complete search history.

(56) References Cited

FOREIGN PATENT DOCUMENTS

CN 105040157 A 11/2015

*Primary Examiner* — James A Fiorito (57) ABSTRACT

A preparation method for a nanocomposite fiber membrane material based on a bio-based liquefied formaldehyde resin is provided. A bio-based raw material is processed through a phenol/polyethylene glycol complex liquefaction process, followed by divalent alkali metal hydroxide high ortho-position induction synthesis resinification and modification with the polymer polyvinyl alcohol to create a spinnable precursor as PVA-BLF. Subsequently, a coaxial electrospinning device is utilized, where PVA-BLF serves as a core layer and a titanium dioxide dispersion is used as a shell layer, to fabricate a PVA-BLF/$TiO_2$ nanocomposite fiber membrane material. The average diameter of the nanocomposite fiber membrane is 150-450 nm, and the specific surface area is 500-700 $m^2$/g. The porosity exceeds 60%, and the fracture elongation ranges from 5.5% to 6.5%, demonstrating excellent filtration performance and excellent regeneration performance, which can be developed as adsorption materials for water and air purification.

7 Claims, 5 Drawing Sheets

PREPARATION METHOD FOR NANOCOMPOSITE FIBER MEMBRANE MATERIAL BASED ON BIO-BASED LIQUEFIED FORMALDEHYDE RESIN

CROSS-REFERENCE TO RELATED APPLICATION

This application claims priority to Chinese patent application No. CN 202310816848.0, filed to China National Intellectual Property Administration (CNIPA) on Jul. 5, 2023, which is herein incorporated by reference in its entirety.

TECHNICAL FIELD

The disclosure relates to the technical field of production of nanofiber membranes, and particularly to a preparation method for a nanocomposite fiber membrane material based on a bio-based liquefied formaldehyde resin.

BACKGROUND

High value-added utilization of biomass feedstocks (also referred to as biomass raw materials) is an important way to achieve goals of carbon peak and carbon neutrality, and is also an important direction of development in the field of materials. However, at present, the utilization rate of these lignin-rich biomass resources is extremely low, and they are often discarded, landfilled, or directly burned, leading to the waste of resources and environmental pollution. To solve this problem, how to use bio-based resources with high added value has become a research hotspot widely concerned by many scholars. Among them, the development of bio-based nanofiber materials is one of the important research directions.

The traditional processing methods such as mechanical thermal grinding and viscose fiber production have issues like complex processes and environmental pollution. Moreover, they only utilize part of main components of raw materials, leading to a significant waste of resources. In recent years, various methods for preparing micro- and nano-scale bio-based fibers have emerged, including direct stretching method, phase separation method, template method, self-assembly method, vapor deposition method, and centrifugal spinning method. However, most of these methods have drawbacks such as demanding preparation conditions, complex process equipment, and limited aspect ratios (i.e., length to diameter ratio) of the fibers, which greatly limit their application range. To enhance the quality of bio-based fibers and expand their application fields, it is essential to develop new bio-based fiber production processes.

Electrospinning, as an advanced nanofiber fabrication technology, has garnered significant attention from researchers due to its broad applicability, simplicity of operation, low cost, and controllable design of the morphology and structure of the fibers. In addition, the liquefaction technology of the biomass feedstocks is an effective way to efficiently utilize biomass resources. Through liquefaction, solid lignin-based macromolecules are decomposed into smaller molecules with high reactivity and certain fluidity, which enables the spinnability of the biomass feedstocks. Therefore, combining the electrospinning technology with the liquefaction technology could offer new opportunities to enhance the quality of the bio-based nanofibers, expand their applications in fields such as air purification, wastewater treatment, energy storage materials, seawater desalination and carbon fibers, promote the high value-added utilization of the biomass resources, and drive the development of the field of materials.

The traditional synthetic process of bio-based liquefied resins is mainly used in the production of adhesives and foam materials. These resins typically have a relatively low molecular weight, viscoelasticity is insufficient, spinning continuity is not good, fiber diameter is large, and fiber quality is poor. Although traditional bio-based electrospun fiber materials are derived from environmentally friendly bio-based raw materials, the solvents used in the electrospinning process are often flammable, explosive, or toxic. Moreover, traditional bio-based nanofiber adsorption materials have poor adsorption effects and are not recyclable.

A preparation method and a spinning method of a lignin liquefaction electrospinning solution are disclosed in Chinese patent No. CN105040157A (corresponding to application No. 201510446922X), which use a lignin liquefied material as a precursor. This method provides a synthesis method for the lignin liquefaction electrospinning solution by taking the lignin liquefied material as the precursor. In the synthesis method for nanofilaments from the lignin liquefied material of this scheme, insoluble solid lignin biomass materials are liquefied into a liquefied lignin material with reactivity in phenol under an acidic catalytic condition. A certain proportion of polyvinylpyrrolidone (PVP) is added to the solvent as a high-molecular-weight linear additive to increase the average molecular weight of the lignin liquefied material itself, resulting in a spinning solution with spinnability at room temperature. The synthesized spinning solution is then used to prepare the nanofilaments from lignin liquefied material through the electrospinning. However, the scheme has the following shortcomings.

(1) The liquefaction method uses phenol as a single liquefying agent, and the liquid-to-solid ratio of phenol to wood powder exceeds 5, with a very small proportion of wood material used, which does not adequately showcase the characteristics of the bio-based raw material.

(2) The liquefied material has not undergone resinification, resulting in a relatively low molecular weight. The viscoelasticity and molecular entanglement required for the electrospinning process largely depend on the added PVP polymer, and the resulting fiber diameters are mostly at the micron level (1-5 micrometers abbreviated as m), not reaching the nanoscale.

(3) Alcohol is used as a solvent, which is highly volatility, making the nanofiber preparation process less environmentally friendly.

(4) The spinning process uses a single-axis spinning method, without any indication of its adsorption effects.

SUMMARY

A purpose of the disclosure is to overcome the shortcomings of the related art, a preparation method for a nanocomposite fiber membrane material based on bio-based liquefied formaldehyde resin is provided, which solves the technical problems of poor adsorption effect and non-renewability of bio-based nanofiber adsorption materials in the related art.

To achieve above purpose, a preparation method for a nanocomposite fiber membrane material based on bio-based liquefied formaldehyde resin is provided, which includes the following steps:

mixing a bio-based raw material, phenol, and polyethylene glycol in a mass ratio of 1:(1-2):(0.5-1) to obtain a first mixture, adding an acid as a catalyzer to the first mixture to react at a temperature in a range of 120-150° C. for 0.5-2 hours (h) to obtain a reacted mixture, then adding a sodium hydroxide solution to the reacted mixture to adjust a potential of hydrogen (pH) to be 7 to thereby obtain a second mixture, followed by cooling down the second mixture at a temperature in a range of 30-40° C. to obtain a bio-based liquefied product;

mixing the bio-based liquefied product, the sodium hydroxide solution, a divalent alkali metal hydroxide, and a formaldehyde solution in a mass ratio of 1:(0.1-0.3):(0.1-0.5):(0.8-1.3) to obtain a mixed solution, heating up the mixed solution to 75-90° C. to react for 30-90 minutes (min) to obtain a reacted solution, and cooling down the reacted solution below 40° C. to obtain the bio-based liquefied formaldehyde resin (BLF);

stirring an aqueous solution of the BLF and an aqueous solution of polyvinyl alcohol (PVA) evenly to react at 50-60° C. for 30-60 min to obtain a reacted BLF-PVA solution, then cooling down the reacted BLF-PVA solution to below 30° C. to obtain a BLF-PVA spinning solution as a precursor for coaxial electrospinning;

using the BLF-PVA spinning solution as a core layer and a nano titanium dioxide ($TiO_2$) aqueous dispersion as a shell layer, and using a coaxial nozzle for the coaxial electrospinning to obtain an initial spun fiber film; and drying the initial spun fiber film at a temperature of 130° C. for 5-15 min to cure and shape, thereby obtaining the nanocomposite fiber membrane material of PVA-BLF/$TiO_2$ with a special secondary structure.

In an embodiment, the bio-based raw material is one selected from the group consisting of wood powder, shell powder of peanut, shell powder of *Juglans regia*, and bamboo powder.

In an embodiment, the acid is one of an inorganic acid and an organic acid, and the one of the inorganic acid and the organic acid is one selected from the group consisting of sulfuric acid, hydrochloric acid, phosphoric acid, formic acid, and oxalic acid.

In an embodiment, the divalent alkali metal hydroxide is one selected from the group consisting of calcium hydroxide, zinc hydroxide, barium hydroxide, and magnesium hydroxide.

In an embodiment, a concentration of the sodium hydroxide solution is 40%, and a concentration of the formaldehyde solution is 37%.

In an embodiment, a dry matter content of the aqueous solution of the BLF is 10%, a concentration of the aqueous solution of the PVA is 10%, and the PVA is a medium degree of polymerization polymer. The aqueous solution of the PVA is prepared as follows:

adding the PVA into water to swell at a room temperature for 5-10 h, thereby obtaining a swelling solution, and followed by reacting the swelling solution at 90° C. for 0.5-2 h to obtain the aqueous solution of the PVA.

In an embodiment, process parameters of the coaxial electrospinning include: a voltage of 15-22 kilovolts (kV), a shell thrust velocity of 0.5-3 milliliters per hour (mL/h), a core thrust velocity of 0.3-1 mL/h, a distance between a needle and a receiver of 10-30 centimeters (cm), a speed of a receiving drum of 80-200 revolutions per minute (r/min), an ambient temperature controlled at 25-35° C., and a humidity of 20-40%, wherein the receiver wrapped in release paper is used.

In an embodiment, a preparation for the nano $TiO_2$ aqueous dispersion includes:

mixing powder of the $TiO_2$, deionized water, and sodium dodecylbenzene sulfonate in a weight ratio of 10:100:0.1 to obtain a mixed $TiO_2$ solution, and followed by treating the mixed $TiO_2$ solution with a low-power ultrasound for 2 h to prepare the nano $TiO_2$ aqueous dispersion with a concentration of 10%.

Compared with the related art, the preparation method for the nanocomposite fiber membrane material based on the bio-based liquefied formaldehyde resin provided by the disclosure has the following beneficial effects.

(1) The preparation method adopts the liquefaction of phenol and polyethylene glycol, with a liquid-to-solid ratio that is at most 3 and can be as low as 1.5, which can better display the characteristics of the bio-based raw material.

(2) The liquefied product in used in the preparation method is resinified, and a high-ortho thermal-setting resin is formed through the complexation and positioning of divalent metal ions, forming a linear molecular structure. This is beneficial for forming sufficient molecular entanglement during the electrospinning process. In addition, the molecular weight of the resin is further increased through the modification of PVA, enhancing the viscoelasticity of the spinning precursor. The fiber diameter obtained by optimizing the process can reach 100-200 nanometers (nm), and the fibers can be strengthened by heating later on, with the tensile elongation at break of the obtained fiber membrane reaching 5.5-6.5%.

(3) The method of the disclosure regulates the molecular structure so that the spinning precursor not only has a certain molecular weight, but also retains good solubility in water by reasonably controlling the mass ratio of formaldehyde to the liquefied product and the concentration of sodium hydroxide in the synthesized resin to meet the requirement of using water as a solvent, thus providing a truly green preparation process for nanofibers.

(4) The method of the disclosure uses coaxial co-electrospinning, uniformly loading inorganic particles with photocatalytic effects on the bio-based fibers through the secondary structure regulation of the electrospinning, forming a nanocomposite fiber membrane with self-cleaning effects. The removal rate for formaldehyde gas and methylene blue both exceeds 85%, showing excellent adsorption performance.

(5) The method of the disclosure uses PVA as a spinning aid to prepare nanofiber adsorption materials with a combination of photocatalytic decomposition and physical-chemical joint adsorption, by regulating the porous structure of the nanofiber film to achieve efficient physical adsorption. On one hand, the nanocomposite fiber membrane can adsorb and concentrate pollutants, providing a good reaction environment for photocatalysis and improving the degradation rate. On the other hand, the nanocomposite fiber membrane can be regenerated through the catalytic decomposition by the photocatalyst $TiO_2$, solving the problem of the difficulty in recycling and utilizing the catalyst. Based on this, a long-term, reusable, and self-cleaning adsorption material that does not completely rely on light exposure is developed.

(6) The disclosure produces a lignin degradation phenolic derivative and a cellulose degradation hydroxyl derivative as the main liquefied products through a phenol/polyethylene glycol complex liquefaction process. The lignin degradation phenolic derivatives are further catalyzed and induced by divalent metal ions to react primarily with aldehydes at ortho positions of the phenolic hydroxyl groups to form long-chain polymers mainly with methylene groups replacing the ortho hydrogen atoms. This increases the polymerization degree of the resin while retaining some hydroxymethyl phenols to maintain the thermosetting characteristics of the resin. On the one hand, the high degree of polymerization improves the problem of poor resin strength, and on the other hand, the fiber film can further increase the strength of the fiber film through heat curing due to the thermosetting properties. The cellulose degradation hydroxyl derivatives provide a certain flexibility to the resin, increase the intermolecular forces of the spinning solution. In addition, the addition of PVA polymer solution for copolymerization is beneficial for forming sufficient molecular entanglement during the electrospinning process, which results in a spinnable bio-based liquefied resin.

(7) The average fiber diameter of a nanocomposite fiber membrane material prepared by the disclosure is 150-450 nm, the specific surface area is 500-700 square meters per gram ($m^2/g$), the porosity exceeds 60%, and the tensile elongation at break ranges from 5.5% to 6.5%, which demonstrates excellent filtration performance. Taking methylene blue as an example, the removal rate exceeds 85% after 8 h while having a strong adsorption rate of volatile organic compounds (VOCs), taking formaldehyde as an example, with a removal rate of up to 85-95%.

In addition, it also demonstrates excellent regeneration performance. After 10 cycles of degradation and adsorption, the methylene blue removal rate of the final sample still exceeds 70% after irradiating the membrane surface with a halogen lamp, which can be developed as adsorption materials for water and air purification.

DETAILED DESCRIPTION OF EMBODIMENTS

The following will further explain the disclosure in conjunction with embodiments of the disclosure. The following embodiments are only intended to provide a clearer explanation of the technical solution of the disclosure and cannot be used to limit the scope of protection of the disclosure.

Embodiment 1

A preparation method for a nanocomposite fiber membrane material based on bio-based liquefied formaldehyde resin includes steps as follows.

Step 1, a bio-based raw material, phenol, and polyethylene glycol are mixed in a mass ratio of 1:1:0.5 to obtain a first mixture, an acid as a catalyzer is added into the first mixture to react at 150° C. for 45 minutes (min) to obtain a reacted mixture, then a sodium hydroxide solution is added into the reacted mixture to adjust a potential of hydrogen (pH) to be 7 (i.e. to neutral) thereby to obtain a second mixture, followed by cooling down the second mixture at 40° C. to obtain a bio-based liquefied product.

Step 2, the bio-based liquefied product, the sodium hydroxide solution, a divalent alkali metal hydroxide, and a formaldehyde solution are mixed in a mass ratio of 1:0.2:0.2:1 to obtain a mixed solution, the mixed solution is heated up to 80° C. to react for 50 min to obtain a reacted solution, and followed by cooling down the reacted solution below 40° C. to obtain the bio-based liquefied formaldehyde resin (BLF).

Step 3, an aqueous solution of the BLF and an aqueous solution of polyvinyl alcohol (PVA) are stirred evenly to react at 50° C. for 30 min to obtain a reacted BLF-PVA solution, then the reacted BLF-PVA solution is cooled down to below 30° C. to obtain a BLF-PVA spinning solution as a precursor for coaxial electrospinning.

Step 4, the BLF-PVA spinning solution is used as a core layer and a nano titanium dioxide ($TiO_2$) aqueous dispersion is used as a shell layer, and a coaxial nozzle is used for the coaxial electrospinning to obtain an initial spun fiber film.

Figure 1:
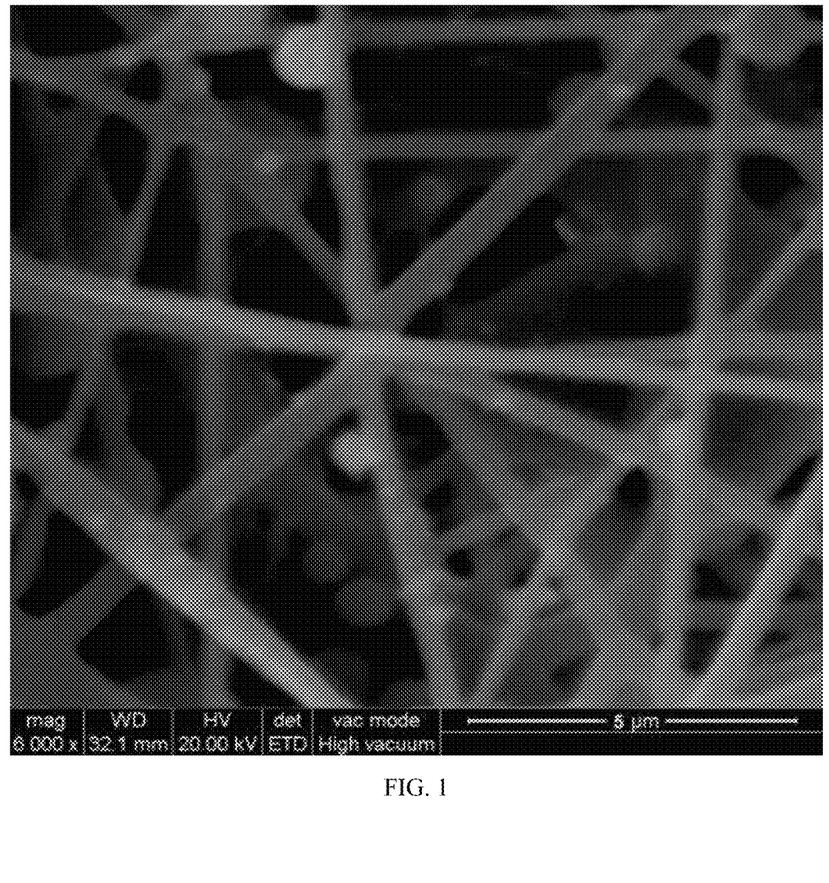
FIG. 1 illustrates a scanning electron microscope (SEM) diagram of a nanocomposite fiber membrane in embodiment 1 of the disclosure.

Step 5, the initial spun fiber film is dried at 130° C. for 10 min to cure and shape, thereby obtaining the nanocomposite fiber membrane material of PVA-BLF/$TiO_2$ with a special secondary structure. An SEM diagram of a nanocomposite fiber membrane is shown in FIG. 1.

The bio-based raw material is shell powder of peanut, the acid is formic acid, the divalent alkali metal hydroxide is barium hydroxide (Ba(OH)$_2$), a concentration of the sodium hydroxide solution is 40%, and a concentration of the formaldehyde solution is 37%.

A dry matter content of the aqueous solution of the BLF is 10%, a concentration of the aqueous solution of the PVA is 10%, and the PVA is a medium degree of polymerization polymer. A preparation for the solution of the PVA is as follows. The PVA is added into water to swell at a normal temperature (i.e., room temperature) for 8 hours (h), thereby obtaining a swelling solution, and followed by reacting the swelling solution at 90° C. for 2 h to obtain the aqueous solution of the PVA.

Process parameters of the coaxial electrospinning includes a voltage of 15 kilovolts (kV), a shell thrust velocity of 1.5 milliliters per hour (mL/h), a core thrust velocity of 0.3 mL/h, a distance between a needle and a receiver of 18 centimeters (cm), a speed of the receiving drum of 200 revolutions per minute (r/min), an ambient temperature controlled at 25-35° C. and a humidity of 20-40%, the receiver wrapped in release paper is used.

A preparation for the nano $TiO_2$ aqueous dispersion is as follows: powder of the $TiO_2$, deionized water, and sodium dodecylbenzene sulfonate are mixed in a weight ratio of 10:100:0.1 to obtain a mixed $TiO_2$ solution, and followed by treating the mixed $TiO_2$ solution with a low-power ultrasound for 2 h to prepare the nano $TiO_2$ aqueous dispersion with a concentration of 10%.

Embodiment 2

A preparation method for a nanocomposite fiber membrane material based on bio-based liquefied formaldehyde resin includes steps as follows.

Step 1, a bio-based raw material, phenol, and polyethylene glycol are mixed in a mass ratio of 1:2:1 to obtain a first mixture, an acid as a catalyzer is added into the first mixture to react at a 130° C. for 90 min to obtain a reacted mixture, then a sodium hydroxide solution is added into the reacted mixture to adjust a pH to be 7 thereby to obtain a second mixture, followed by cooling down the second mixture at 40° C. to obtain a bio-based liquefied product.

Step 2, the bio-based liquefied product, the sodium hydroxide solution, a divalent alkali metal hydroxide, and a formaldehyde solution are mixed in a mass ratio of 1:0.3:0.2:1.2 to obtain a mixed solution, the mixed solution is heated up to 85° C. to react for 45 min to obtain a reacted solution, and followed by cooling down the reacted solution below 40° C. to obtain the BLF.

Step 3, an aqueous solution of the BLF and an aqueous solution of PVA are stirred evenly to react at 55° C. for 40 min to obtain a reacted BLF-PVA solution, then the reacted BLF-PVA solution is cooled down to below 30° C. to obtain a BLF-PVA spinning solution as a precursor for coaxial electrospinning.

Step 4, the BLF-PVA spinning solution is used as a core layer and a nano $TiO_2$ aqueous dispersion is used as a shell layer, and a coaxial nozzle is used for the coaxial electrospinning to obtain an initial spun fiber film.

Figure 2:
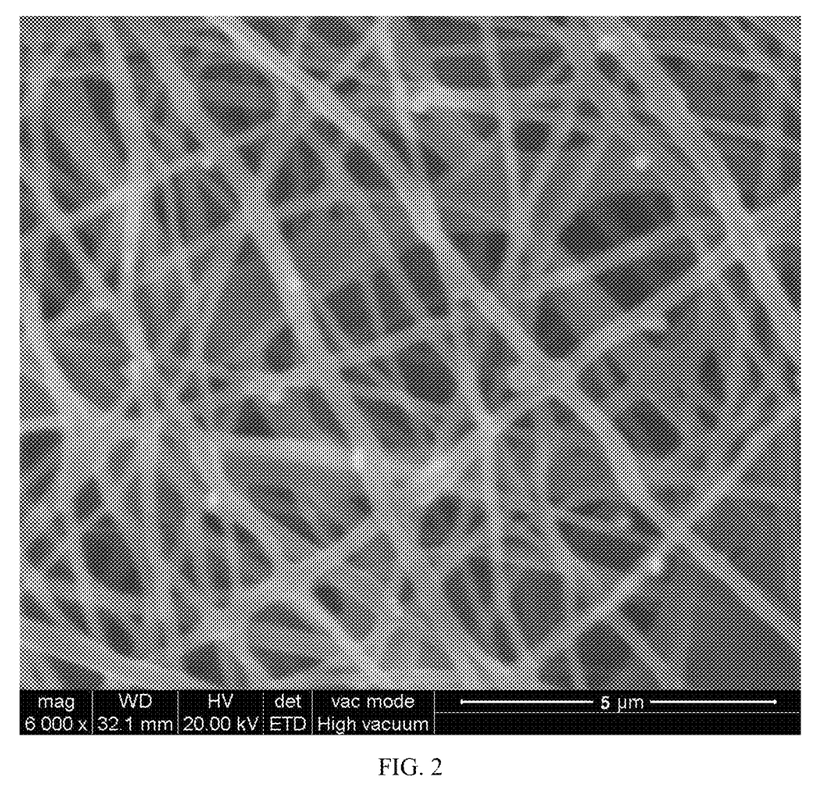
FIG. 2 illustrates an SEM diagram of a nanocomposite fiber membrane in embodiment 2 of the disclosure.

Step 5, the initial spun fiber film is dried at 130° C. for 15 min to cure and shape, thereby obtaining the nanocomposite fiber membrane material of PVA-BLF/$TiO_2$ with a special secondary structure. An SEM diagram of a nanocomposite fiber membrane is shown in FIG. 2.

The bio-based raw material is shell powder of peanut, the acid is hydrochloric acid, the divalent alkali metal hydroxide is zinc hydroxide ($Zn(OH)_2$), a concentration of the sodium hydroxide solution is 40%, and a concentration of the formaldehyde solution is 37%.

A dry matter content of the aqueous solution of the BLF is 10%, a concentration of the aqueous solution of the PVA is 10%, and the PVA is a medium degree of polymerization polymer. A preparation for the solution of the PVA is as follows. The PVA is added into water to swell at a normal temperature for 8 h, thereby obtaining a swelling solution, and followed by reacting the swelling solution at 90° C. for 2 h to obtain the solution of the PVA.

Process parameters of the coaxial electrospinning includes a voltage of 18 kV, a shell thrust velocity of 1.8 mL/h, a core thrust velocity of 0.5 mL/h, a distance between a needle and a receiver of 15 cm, a speed of the receiving drum of 150 r/min, an ambient temperature controlled at 25-35° C. and a humidity of 20-40%, the receiver wrapped in release paper is used.

A preparation for the nano $TiO_2$ aqueous dispersion is as follows: powder of the $TiO_2$, deionized water, and sodium dodecylbenzene sulfonate are mixed in a weight ratio of 10:100:0.1 to obtain a mixed $TiO_2$ solution, and followed by treating the mixed $TiO_2$ solution with a low-power ultrasound for 2 h to prepare the nano $TiO_2$ aqueous dispersion with a concentration of 10%.

Embodiment 3

A preparation method for a nanocomposite fiber membrane material based on bio-based liquefied formaldehyde resin includes steps as follows.

Step 1, a bio-based raw material, phenol, and polyethylene glycol are mixed in a mass ratio of 1:2:1 to obtain a first mixture, an acid as a catalyzer is added into the first mixture to react at 120° C. for 60 min to obtain a reacted mixture, then a sodium hydroxide solution is added into the reacted mixture to adjust a pH to be 7 thereby to obtain a second mixture, followed by cooling down the second mixture at 40° C. to obtain a bio-based liquefied product.

Step 2, the bio-based liquefied product, the sodium hydroxide solution, a divalent alkali metal hydroxide, and a formaldehyde solution are mixed in a mass ratio of 1:0.3:0.3:1.2 to obtain a mixed solution, the mixed solution is heated up to 75° C. to react for 60 min to obtain a reacted solution, and followed by cooling down the reacted solution below 40° C. to obtain the BLF.

Step 3, an aqueous solution of the BLF and an aqueous solution of PVA are stirred evenly to react at 60° C. for 50 min to obtain a reacted BLF-PVA solution, then the reacted BLF-PVA solution is cooled down to below 30° C. to obtain a BLF-PVA spinning solution as a precursor for coaxial electrospinning.

Step 4, the BLF-PVA spinning solution is used as a core layer and a nano $TiO_2$ aqueous dispersion is used as a shell layer, and a coaxial nozzle is used for the coaxial electrospinning to obtain an initial spun fiber film.

Figure 3:
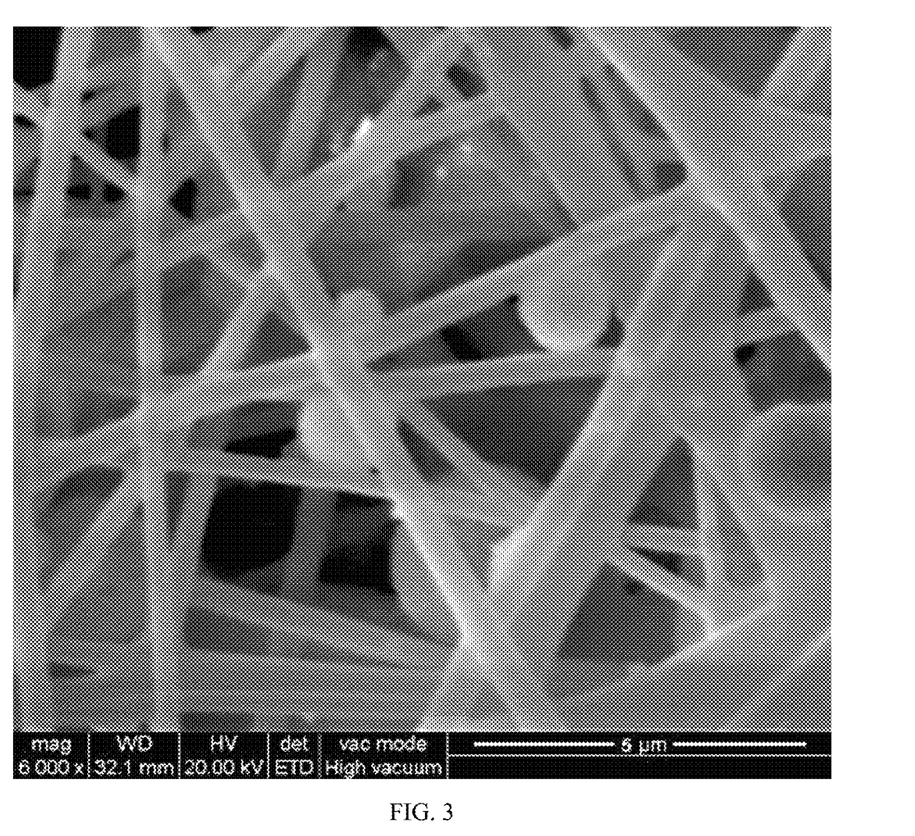
FIG. 3 illustrates an SEM diagram of a nanocomposite fiber membrane in embodiment 3 of the disclosure.

Step 5, the initial spun fiber film is dried at 130° C. for 10 min to cure and shape, thereby obtaining the nanocomposite fiber membrane material of PVA-BLF/$TiO_2$ with a special secondary structure. An SEM diagram of a nanocomposite fiber membrane is shown in FIG. 3.

The bio-based raw material is poplar powder, the acid is sulfuric acid, the divalent alkali metal hydroxide is calcium hydroxide ($Ca(OH)_2$), a concentration of the sodium hydroxide solution is 40%, and a concentration of the formaldehyde solution is 37%.

A dry matter content of the aqueous solution of the BLF is 10%, a concentration of the aqueous solution of the PVA is 10%, and the PVA is a medium degree of polymerization polymer. A preparation for the solution of the PVA is as follows. The PVA is added into water to swell at a normal temperature for 8 h, thereby obtaining a swelling solution, and followed by reacting the swelling solution at 90° C. for 2 h to obtain the solution of the PVA.

Process parameters of the coaxial electrospinning includes a voltage of 20 kV, a shell thrust velocity of 2 mL/h, a core thrust velocity of 0.4 mL/h, a distance between a needle and a receiver of 10 cm, a speed of the receiving drum of 300 r/min, an ambient temperature controlled at 25-35° C. and a humidity of 20-40%, the receiver wrapped in release paper is used.

A preparation for the nano $TiO_2$ aqueous dispersion is as follows: powder of the $TiO_2$, deionized water, and sodium dodecylbenzene sulfonate are mixed in a weight ratio of 10:100:0.1 to obtain a mixed $TiO_2$ solution, and followed by treating the mixed $TiO_2$ solution with a low-power ultrasound for 2 h to prepare the nano $TiO_2$ aqueous dispersion with a concentration of 10%.

Embodiment 4

A preparation method for a nanocomposite fiber membrane material based on bio-based liquefied formaldehyde resin includes steps as follows.

Step 1, a bio-based raw material, phenol, and polyethylene glycol are mixed in a mass ratio of 1:2:0.5 to obtain a first mixture, an acid as a catalyzer is added into the first mixture to react at 150° C. for 80 min to obtain a reacted mixture, then a sodium hydroxide is added into the reacted mixture to adjust a pH to be 7 thereby to obtain a second mixture, followed by cooling down the second mixture at 40° C. to obtain a bio-based liquefied product.

Step 2, the bio-based liquefied product, the sodium hydroxide solution, a divalent alkali metal hydroxide, and a formaldehyde solution are mixed in a mass ratio of 1:0.3:0.4:1.3 to obtain a mixed solution, the mixed solution is heated up to 90° C. to react for 30 min to obtain a reacted solution, and followed by cooling down the reacted solution below 40° C. to obtain the BLF.

Step 3, an aqueous solution of the BLF and an aqueous solution of PVA are stirred evenly to react at 60° C. for 40 min to obtain a reacted BLF-PVA solution, then the reacted BLF-PVA solution is cooled down to below 30° C. to obtain a BLF-PVA spinning solution as a precursor for coaxial electrospinning.

Step 4, the BLF-PVA spinning solution is used as a core layer and a nano $TiO_2$ aqueous dispersion is used as a shell layer, and a coaxial nozzle is used for the coaxial electrospinning to obtain an initial spun fiber film.

Figure 4:
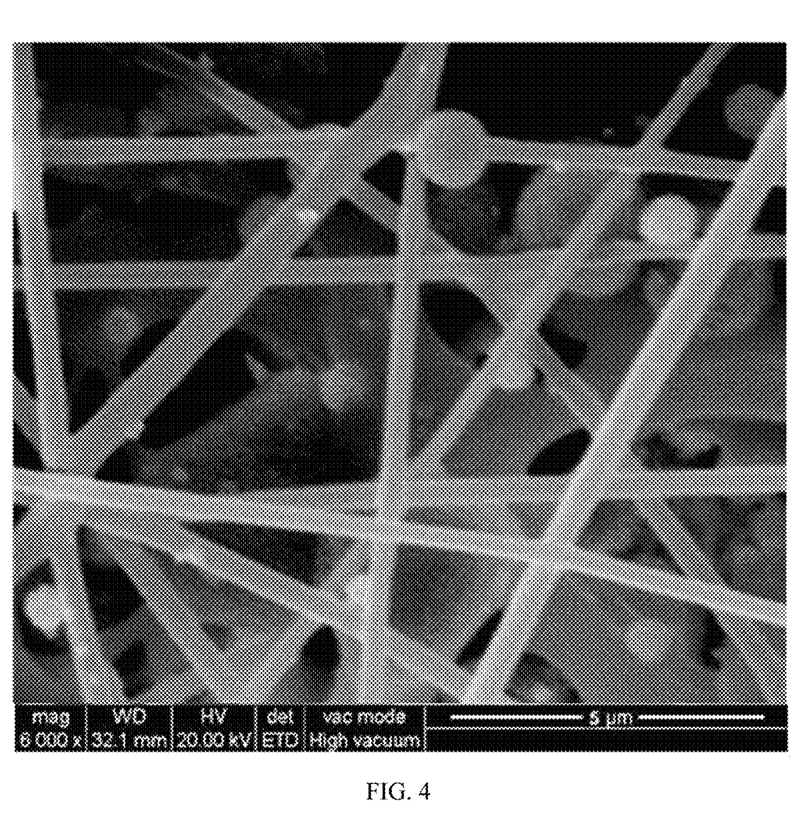
FIG. 4 illustrates an SEM diagram of a nanocomposite fiber membrane in embodiment 4 of the disclosure.

Step 5, the initial spun fiber film is dried at 130° C. for 15 min to cure and shape, thereby obtaining the nanocomposite fiber membrane material of PVA-BLF/$TiO_2$ with a special secondary structure. An SEM diagram of a nanocomposite fiber membrane is shown in FIG. 4.

The bio-based raw material is shell powder of *Juglans regia*, the acid is oxalic acid, the divalent alkali metal hydroxide is $Zn(OH)_2$, a concentration of the sodium hydroxide solution is 40%, and a concentration of the formaldehyde solution is 37%.

A dry matter content of the aqueous solution of the BLF is 10%, a concentration of the aqueous solution of the PVA is 10%, and the PVA is a medium degree of polymerization polymer. A preparation for the solution of the PVA is as follows. The PVA is added into water to swell at a normal temperature for 8 h, thereby obtaining a swelling solution, and followed by reacting the swelling solution at 90° C. for 2 h to obtain the solution of the PVA.

Process parameters of the coaxial electrospinning includes a voltage of 12 kV, a shell thrust velocity of 2.2 mL/h, a core thrust velocity of 0.6 mL/h, a distance between a needle and a receiver of 20 cm, a speed of the receiving drum of 100 r/min, an ambient temperature controlled at 25-35° C. and a humidity of 20-40%, the receiver wrapped in release paper is used.

A preparation for the nano $TiO_2$ aqueous dispersion is as follows: powder of the $TiO_2$, deionized water, and sodium dodecylbenzene sulfonate are mixed in a weight ratio of 10:100:0.1 to obtain a mixed $TiO_2$ solution, and followed by treating the mixed $TiO_2$ solution with a low-power ultrasound for 2 h to prepare the nano $TiO_2$ aqueous dispersion with a concentration of 10%.

Embodiment 5

A preparation method for a nanocomposite fiber membrane material based on bio-based liquefied formaldehyde resin includes steps as follows.

Step 1, a bio-based raw material, phenol, and polyethylene glycol are mixed in a mass ratio of 1:2:1 to obtain a first mixture, an acid as a catalyzer is added into the first mixture to react at 140° C. for 90 min to obtain a reacted mixture, then a sodium hydroxide is added into the reacted mixture to adjust a pH to be 7 thereby to obtain a second mixture, followed by cooling down the second mixture at 40° C. to obtain a bio-based liquefied product.

Step 2, the bio-based liquefied product, the sodium hydroxide solution, a divalent alkali metal hydroxide, and a formaldehyde solution are mixed in a mass ratio of 1:0.4:0.1:1.3 to obtain a mixed solution, the mixed solution is heated up to 85° C. to react for 55 min to obtain a reacted solution, and followed by cooling down the reacted solution below 40° C. to obtain the BLF.

Step 3, an aqueous solution of the BLF and an aqueous solution of PVA are stirred evenly to react at 50° C. for 40 min to obtain a reacted BLF-PVA solution, then the reacted BLF-PVA solution is cooled down to below 30° C. to obtain a BLF-PVA spinning solution as a precursor for coaxial electrospinning.

Step 4, the BLF-PVA spinning solution is used as a core layer and a nano $TiO_2$ aqueous dispersion is used as a shell layer, and a coaxial nozzle is used for the coaxial electrospinning to obtain an initial spun fiber film.

Figure 5:
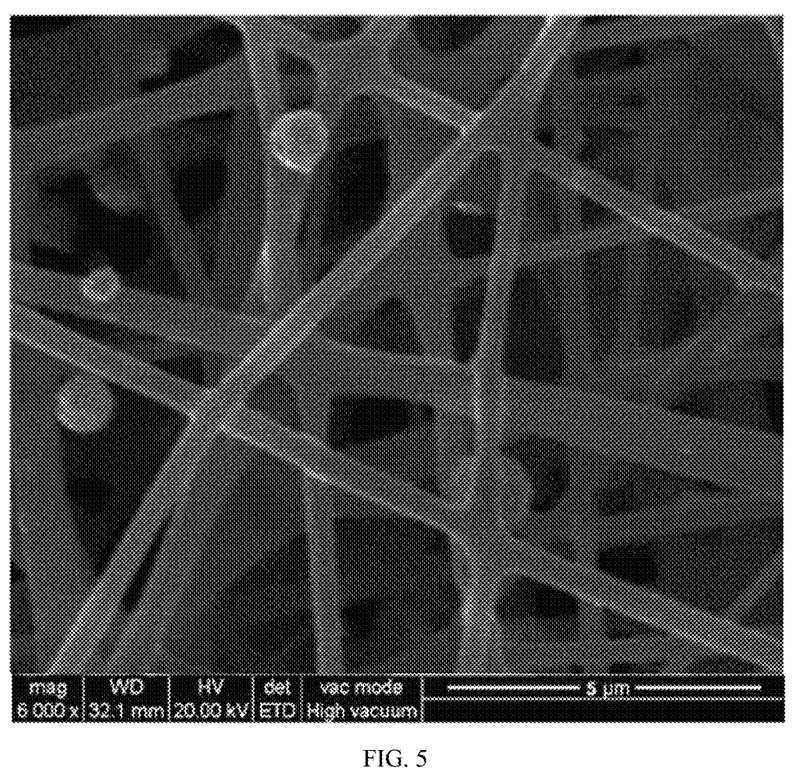
FIG. 5 illustrates an SEM diagram of a nanocomposite fiber membrane in embodiment 5 of the disclosure.

Step 5, the initial spun fiber film is dried at 130° C. for 5 min to cure and shape, thereby obtaining the nanocomposite fiber membrane material of PVA-BLF/$TiO_2$ with a special secondary structure. An SEM diagram of a nanocomposite fiber membrane is shown in FIG. 5.

The bio-based raw material is bamboo powder, the acid is phosphoric acid, the divalent alkali metal hydroxide is magnesium hydroxide ($Mg(OH)_2$), a concentration of the sodium hydroxide solution is 40%, and a concentration of the formaldehyde solution is 37%.

A dry matter content of the aqueous solution of the BLF is 10%, a concentration of the aqueous solution of the PVA is 10%, and the PVA is a medium degree of polymerization polymer. A preparation for the solution of the PVA is as follows. The PVA is added into water to swell at a normal temperature for 8 h, thereby obtaining a swelling solution, and followed by reacting the swelling solution at 90° C. for 2 h to obtain the solution of the PVA.

Process parameters of the coaxial electrospinning includes a voltage of 12 kV, a shell thrust velocity of 1.6 mL/h, a core thrust velocity of 1 mL/h, a distance between a needle and a receiver of 30 cm, a speed of the receiving drum of 180 r/min, an ambient temperature controlled at 25-35° C. and a humidity of 20-40%, the receiver wrapped in release paper is used.

A preparation for the nano $TiO_2$ aqueous dispersion is as follows: powder of the $TiO_2$, deionized water, and sodium dodecylbenzene sulfonate are mixed in a weight ratio of 10:100:0.1 to obtain a mixed $TiO_2$ solution, and followed by treating the mixed $TiO_2$ solution with a low-power ultrasound for 2 h to prepare the nano $TiO_2$ aqueous dispersion with a concentration of 10%.

The main performance test data of the steps and the prepared nanocomposite fiber membranes of embodiment 1 to embodiment 5 are shown in Table 1.

TABLE 1

Steps and main performance test data of the prepared nanocomposite fiber membranes in the embodiment 1 to the embodiment 5

| Embodiment | | 1 | 2 | 3 | 4 | 5 |
|---|---|---|---|---|---|---|
| Step 1 | bio-based raw material | shell powder of peanut | shell powder of peanut | poplar powder | shell powder of *Juglans regia* | bamboo powder |
|  | bio-based raw material/phenol/ polyethylene glycol | 1/1/0.5 | 1/2/1 | 1/2/1 | 1/2/0.5 | 1/2/1 |
|  | acid | formic acid | hydrochloric acid | sulfuric acid | oxalic acid | phosphoric acid |

TABLE 1-continued

Steps and main performance test data of the prepared nanocomposite fiber membranes in the embodiment 1 to the embodiment 5

| | Embodiment | 1 | 2 | 3 | 4 | 5 |
|---|---|---|---|---|---|---|
| | liquefaction temperature (° C.) | 150 | 130 | 120 | 150 | 140 |
| | liquefaction time (min) | 45 | 90 | 60 | 80 | 120 |
| Step 2 | bio-based liquefied product/sodium hydroxide solution/divalent alkali metal hydroxide/ formaldehyde solution | 1/0.2/ 0.2/1 | 1/0.3/ 0.2/1.2 | 1/0.3/ 0.3/1.2 | 1/0.3/ 0.4/1.3 | 1/0.4/ 0.1/1.3 |
| | divalent alkali metal hydroxide | Ba(OH)$_2$ | Zn(OH)$_2$ | Ca(OH)$_2$ | Zn(OH)$_2$ | Mg(OH)$_2$ |
| | resinization temperature (° C.) | 80 | 85 | 75 | 90 | 85 |
| | resinization time (min) | 50 | 45 | 60 | 30 | 55 |
| Step 3 | temperature of reaction with PVA (° C.) | 50 | 55 | 60 | 60 | 50 |
| | time of reaction with PVA (min) | 30 | 40 | 50 | 40 | 40 |
| Step 4 | voltage (kV) | 15 | 18 | 20 | 12 | 12 |
| | shell thrust velocity (mL/h) | 1.5 | 1.8 | 2.0 | 2.2 | 1.6 |
| | core thrust velocity (mL/h) | 0.3 | 0.5 | 0.4 | 0.6 | 1 |
| | receiving distance (cm) | 18 | 15 | 10 | 20 | 30 |
| | speed of the receiving drum (r/min) | 200 | 150 | 300 | 100 | 180 |
| Step 5 | dry time (min) | 10 | 15 | 10 | 15 | 5 |
| main | fiber diameter (nm) | 400-450 | 150-200 | 300-350 | 200-250 | 350-400 |
| properties | elongation at break (%) | 5.79 | 6.15 | 6.32 | 6.06 | 5.83 |
| of fiber membranes | formaldehyde removal rate (%) | 86.8 | 92.3 | 88.1 | 90.3 | 87.9 |
| | methylene blue removal rate (%) | 88.6 | 93.5 | 89.7 | 92.8 | 86.4 |
| | renewability (Removal rate after 10 cycles) % | 71.8 | 75.1 | 71.2 | 72.4 | 70.3 |
| | SEM | FIG. 1 | FIG. 2 | FIG. 3 | FIG. 4 | FIG. 5 |

The method for testing the tensile elongation at break of the nanocomposite fiber membrane is as follows: a Model 3365 Universal Testing Machine (Instron Co., USA) is used to test the tensile properties of the sample. According to the national standard ASTM D882-09, the fiber film is cut into test pieces with a length of 15 mm and a width of 5 mm. The tensile rate is set to 10 millimeters per minute (mm/mmn), and the temperature and the humidity are maintained at room temperature and 30%, respectively. Three samples of the nanocomposite fiber membrane material under the same condition are taken to measure separately.

The formaldehyde adsorption testing method includes:
a sealed space is constructed, and a formaldehyde solution is diluted with deionized water in a 1:50 ratio to obtain a diluted formaldehyde solution and then the diluted formaldehyde solution is sprayed. A formaldehyde detector (MVEF500) is used to observe real-time changes in formaldehyde levels within the space. Once readings of the formaldehyde detector are stabilized, the nanocomposite fiber membranes prepared in the embodiments 1 to 5 are placed into the space to test formaldehyde adsorption performances of the nanocomposite fiber membrane materials. A formula for calculating a removal rate of the formaldehyde is as follows:

$$M = \frac{C0 - C1}{C0} \times 100\%,$$

where M represents the removal rate of the formaldehyde (%); C0 represents an initial concentration of the formaldehyde (mg/m$^3$); C1 represents a final concentration of the formaldehyde (mg/m$^3$).

A testing method for the adsorption performance of methylene blue includes:
100 mL of methylene blue solutions with a certain mass concentration is prepared, 0.1 gram (g) of the nanocomposite fiber membranes prepared in the embodiments 1 to 5 are added into the methylene blue solutions, respectively. The methylene blue solutions added with the nanocomposite fiber membranes are oscillated at a constant temperature water bath to adsorb (at a speed of 110 r/min).

The characteristic wavelength A of the methylene blue is 664 nanometers (nm). The UV-visible spectrophotometer is adjusted to the corresponding parameters. After the oscillation and the adsorption is finished, the absorbances of the obtained solutions (i.e., the methylene blue solutions added with the nanocomposite fiber membranes) are measured, and then the absorbances are substituted into the standard curve formula to calculate the mass concentration of the methylene blue. An adsorption amount of the methylene blue Q and a removal rate of the methylene blue P are calculated using the following formulas:

$$Q = (C_0 - C_e)V/m, \; p = \frac{c_0 - c_e}{c_0} \times 100\%;$$

where Q represents the adsorption amount of the methylene blue, milligram per gram (mg/g); $C_0$ represents an initial concentration of the methylene blue before adsorption, milligram per liter (mg/L); $C_e$ represents an equilibrium concentration of the methylene blue after adsorption, mg/L; V represents a volume of the methylene blue solution, liter (L); m represents a mass of the nanocomposite fiber membrane, gram (g).

In the disclosure, the bio-based raw material used in the preparation method of bio based liquefied resin nanocomposite fiber membrane material is changed, including wood powder, shell powder of peanut, shell powder of *Juglans regia*, bamboo powder, and other different bio based raw materials, different acids such as formic acid, sulfuric acid, hydrochloric acid, oxalic acid, and phosphoric acid are used as catalysts, and parameters of device are adjusted according to the raw materials during the preparation process, so that five embodiments are completed. Through specific performance testing of these embodiments, it can be seen that the nanocomposite fiber membrane material prepared by the disclosure has excellent performance, high utilization rate, and is also environmentally friendly. The average fiber diameter of the nanocomposite fiber membrane prepared in the embodiments 1 to 5 is 150-450 nm, and the specific surface area is 500-700 m²/g. The porosity exceeds 60%, and the tensile elongation at break ranges from 5.5% to 6.5%, demonstrating excellent filtration performance.

Taking the methylene blue as an example, the removal rate exceeds 85% after 8 hours while having a strong adsorption rate of volatile organic compounds (VOCs), taking formaldehyde as an example, with a removal rate of up to 85-95%. In addition, it also demonstrates excellent regeneration performance. After 10 cycles of degradation and adsorption, the methylene blue removal rate of the final sample still exceeds 70% after irradiating the membrane surface with a halogen lamp, which can be developed as adsorption materials for water and air purification.

As shown in FIGS. 1-5, it can be seen that the bio-based raw materials can form a fibrous network structure with a diameter of about 150-450 nm after the process of liquefied resin electrospinning. The coaxial co-spinning has successfully loaded the nano $TiO_2$ onto the bio-based fibers. The degree of liquefaction and degradation varies with different bio-based materials, leading to different degrees of branching and hence different surface tensions. Moreover, the ortho-positioning effect of different divalent metal ions differs, which results in different viscoelastic properties of the molecules formed, causing variations in viscosity. Additionally, the conductivities of the liquefied resin formed by different acid catalysis also vary, which will affect the morphological structure of the electrospun fibers. The liquefied resin catalyzed by the hydrochloric acid and the sulfuric acid has a higher conductivity, resulting in denser fibers (FIGS. 2 and 3). The liquefied resin catalyzed by the acetic acid, the oxalic acid, and the phosphoric acid has a lower conductivity, resulting in relatively looser fibers (FIGS. 1, 4, and 5). The zinc hydroxide has the best ortho and para-positioning effect, presenting more linear structures with better toughness, and the fibers formed are finer in diameter (FIGS. 2 and 5).

It should be noted that the described embodiments are only some of the embodiments of the disclosure, not all of them. Based on the embodiments in the disclosure, all other embodiments obtained by those skilled in the art without creative labor fall within the scope of protection of the disclosure.

What is claimed is:

1. A preparation method for a nanocomposite fiber membrane material based on a bio-based liquefied formaldehyde resin, comprising:
   mixing a bio-based raw material, phenol, and polyethylene glycol in a mass ratio of 1:(1-2):(0.5-1) to obtain a first mixture, adding an acid as a catalyzer to the first mixture to react at a temperature in a range of 120-150° C. for 0.5-2 hours (h) to obtain a reacted mixture, then adding a sodium hydroxide solution to the reacted mixture to adjust a potential of hydrogen (pH) to be 7 to thereby obtain a second mixture, followed by cooling down the second mixture at a temperature in a range of 30-40° C. to obtain a bio-based liquefied product;
   mixing the bio-based liquefied product, the sodium hydroxide solution, a divalent alkali metal hydroxide, and a formaldehyde solution in a mass ratio of 1:(0.1-0.3):(0.1-0.5):(0.8-1.3) to obtain a mixed solution, heating up the mixed solution to 75-90° C. to react for 30-90 minutes (min) to obtain a reacted solution, and cooling down the reacted solution below 40° C. to obtain the bio-based liquefied formaldehyde resin (BLF);
   stirring an aqueous solution of the BLF and an aqueous solution of polyvinyl alcohol (PVA) evenly to react at 50-60° C. for 30-60 min to obtain a reacted BLF-PVA solution, then cooling down the reacted BLF-PVA solution to below 30° C. to obtain a BLF-PVA spinning solution as a precursor for coaxial electrospinning;
   using the BLF-PVA spinning solution as a core layer and a nano titanium dioxide ($TiO_2$) aqueous dispersion as a shell layer, and using a coaxial nozzle for the coaxial electrospinning to obtain an initial spun fiber film; and
   drying the initial spun fiber film at a temperature of 130° C. for 5-15 min to cure and shape, thereby obtaining the nanocomposite fiber membrane material of PVA-BLF/$TiO_2$ with a special secondary structure;
   wherein a concentration of the sodium hydroxide solution is 40%, and a concentration of the formaldehyde solution is 37%.

2. The preparation method for the nanocomposite fiber membrane material based on the bio-based liquefied formaldehyde resin as claimed in claim 1, wherein the bio-based raw material is one selected from the group consisting of wood powder, shell powder of peanut, shell powder of *Juglans regia*, and bamboo powder.

3. The preparation method for the nanocomposite fiber membrane material based on the bio-based liquefied formaldehyde resin as claimed in claim 1, wherein the acid is one of an inorganic acid and an organic acid, and the one of the inorganic acid and the organic acid is one selected from the group consisting of sulfuric acid, hydrochloric acid, phosphoric acid, formic acid, and oxalic acid.

4. The preparation method for the nanocomposite fiber membrane material based on the bio-based liquefied formaldehyde resin as claimed in claim 1, wherein the divalent alkali metal hydroxide is one selected from the group consisting of calcium hydroxide, zinc hydroxide, barium hydroxide, and magnesium hydroxide.

5. The preparation method for the nanocomposite fiber membrane material based on the bio-based liquefied formaldehyde resin as claimed in claim 1, wherein a dry matter content of the aqueous solution of the BLF is 10%, a concentration of the aqueous solution of the PVA is 10%, and the PVA is a medium degree of polymerization polymer;

wherein the aqueous solution of the PVA is prepared as follows:

adding the PVA into water to swell at a room temperature for 5-10 h, thereby obtaining a swelling solution, and followed by reacting the swelling solution at 90° C. for 0.5-2 h to obtain the aqueous solution of the PVA.

6. The preparation method for the nanocomposite fiber membrane material based on the bio-based liquefied formaldehyde resin as claimed in claim 1, wherein process parameters of the coaxial electrospinning comprise: a voltage of 15-22 kilovolts (kV), a shell thrust velocity of 0.5-3 milliliters per hour (mL/h), a core thrust velocity of 0.3-1 mL/h, a distance between a needle and a receiver of 10-30 centimeters (cm), a speed of a receiving drum of 80-200 revolutions per minute (r/min), an ambient temperature controlled at 25-35° C., and a humidity of 20-40%, wherein the receiver wrapped in release paper is used.

7. The preparation method for the nanocomposite fiber membrane material based on the bio-based liquefied formaldehyde resin as claimed in claim 1, wherein the nano $TiO_2$ aqueous dispersion is prepared as follows:

mixing powder of the $TiO_2$, deionized water, and sodium dodecylbenzene sulfonate in a weight ratio of 10:100:0.1 to obtain a mixed $TiO_2$ solution, and followed by treating the mixed $TiO_2$ solution with a low-power ultrasound for 2 h to prepare the nano $TiO_2$ aqueous dispersion with a concentration of 10%.

\* \* \* \* \*